J. HUBER.
VALVE.
APPLICATION FILED JAN. 9, 1915.
1,236,939.
Patented Aug. 14, 1917.
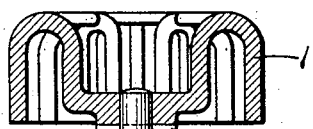
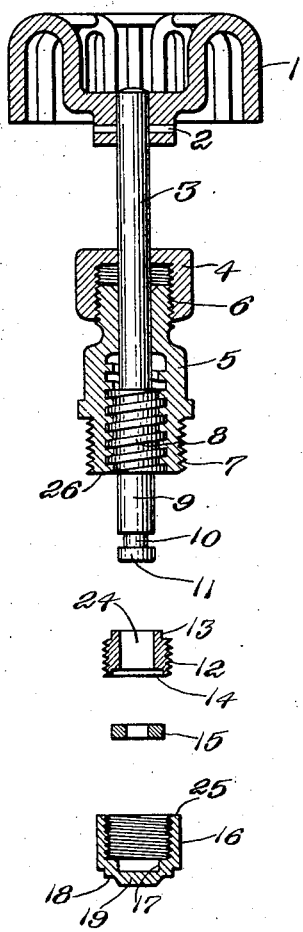
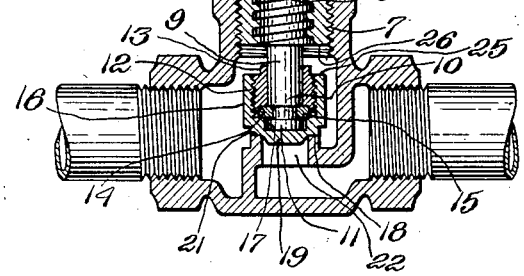
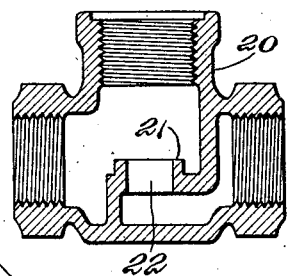
Inventor:
Jacob Huber,
by Roberts Roberts & Cushman
Attorneys.

UNITED STATES PATENT OFFICE.

JACOB HUBER, OF BOSTON, MASSACHUSETTS, ASSIGNOR TO THE UNITED INJECTOR COMPANY, OF BOSTON, MASSACHUSETTS, A CORPORATION OF MASSACHUSETTS.

VALVE.

1,236,939.  Specification of Letters Patent.  Patented Aug. 14, 1917.

Application filed January 9, 1915. Serial No. 1,449.

*To all whom it may concern:*

Be it known that I, JACOB HUBER, a citizen of the United States, and resident of Boston, in the county of Suffolk and State of Massachusetts, have invented new and useful Improvements in Valves, of which the following is a specification.

My invention consists in improvements in the construction of valves, and is particularly applicable to small sized valves of the class in which the valve itself is a separate part, rather loosely hung on the valve stem, so as to be capable of slight shifting movements in relation to the valve seat, so as to distribute wear and insure tight seating for a long period of use. In the larger sizes, such valves are frequently made to screw on to a valve holding thimble which slips over the screw threaded portion of the valve stem (where it engages an internal screw thread in the bonnet) from the handle end, and is held to place by an enlargement at the end of the stem and integral therewith. But in making small sizes of such valves, this mode of valve attachment would involve too great a reduction in the diameter of the valve stem, at the screw threaded part thereof, to be consistent with the required strength of the parts. In the small sizes recourse has been had to small holding pins, driven transversely through the cup-shaped valve and engaging a groove made in the valve stem near its end; but such contrivances are inadvisable, both from the manufacturer's point of view, and that of the user, who, when he has to repair or re-grind the valve, is obliged to drive out the pins, which are liable to be lost, and also to drive in and rehead the pins when reassembling the parts.

The object of my improvements, presently to be described, is to provide a workmanlike, easily assembled and easily dismantled valve structure of this general type, with parts which cannot accidentally become disengaged, and which provides ample dimensions and strength to sustain the stresses of use.

In the drawings hereto annexed, which illustrate my invention,—

Figure 1 is a collective view for the most part in section of the parts of my improved valve, shown separated;

Fig. 2 is a sectional view of the assembled valve; and

Fig. 3 is a plan view of the valve-holding split ring.

The parts shown are as follows: 1 is the valve handle, 2 a pin securing the handle to the valve stem, 3 the valve stem, 4 the thimble or cap which confines the packing material, 5 the bonnet, threaded at 6 to engage the packing thimble, at 7 to engage the valve casing, and internally threaded to engage the operating thread 8 on the valve stem; 9 is the lower end of the valve stem, of uniform diameter to the stem-end 11, except for the groove 10, cut in the stem near the end thereof. 12 is a valve thimble with a hole 24, which loosely fits over the lower end 9 of the stem, slabbed sides 13, to take a wrench or key, and an annular shoulder 14 to engage the snap ring 15. The snap ring 15 is a split or open ring, of which the internal diameter fits closely around the reduced portion of the stem at the groove 10 therein, its external diameter being greater than that of the lower end 9 of the stem; the distance across the cut 23 is slightly less than the diameter of the reduced portion of the stem end at the groove 10, so that the ring 15, when snapped over the stem in the groove 10 will remain there until forcibly pressed off. 16 is the valve proper, cup shaped, with an internal thread to engage the external thread on the valve thimble 12, a recess 17 in the bottom, which fits loosely over the stem end 11, a seating surface at 18, and a boss 19, to enter the aperture in the valve seat. The upper rim 25 of the valve 16 is adapted to make seating contact with the lower rim 26 of the bonnet 5. The casing 20, into which the bonnet 5 is screwed, has the usual valve seat 21 and aperture 22.

In assembling these parts, the thimble 4 and bonnet 5 are slipped over the handle end of the stem 3, the handle 1 is then attached; valve thimble 12 is slipped over the stem end on to the part 9, the split or open ring 15 is then snapped into place in the groove 10, confining the thimble 12 between the ring and the screw threaded portion 8 of the stem 3, which is larger in diameter than the part 9 of the stem. Then the valve 16 is secured tightly on to the valve thimble 12 clamping the ring 15 between the opposed surfaces of the thimble 12 and valve 16 respectively.

Since the thimble 12 makes a loose sliding fit with the part 9 of the valve stem, and the stem end 11 fits loosely in the recess 17 in the valve 16, the valve will always present itself squarely to the valve seat 21, in the casing. The recess in the bottom of thimble 12 defined by the shoulder 14 is of such diameter that the ring 15 fits thereinto as shown in Fig. 2. Thus the ring is held more accurately in position and is restrained from sliding out of the groove 10 when thimble 12 and valve 16 are clamped thereover. The overhanging shoulder 14 also affords a longer threaded periphery upon the thimble 12. The open ring 15 has only to sustain the trifling stresses incident to lifting the valve 16, or to bringing the upper rim 25 of the valve into seating contact with the lower rim 26 of the bonnet 5, which is done whenever the bonnet has to be re-packed while there is fluid under pressure in the casing 20. The closing pressure on the valve is sustained by the stem end 11 which bears on the bottom of the recess 17 in the valve 16.

To dismantle the valve, operations are performed in reverse order. There are no troublesome pins to drive out, and when the valve 16 is unscrewed and removed, the holding ring 15 remains in place until deliberately pressed off, when the simplest precautions will prevent its being lost. Since the valve and the parts immediately associated with it are put on over the end of the stem, the screw thread 8 may be made of ample size and diameter.

While I prefer to make the ring 15 embrace the groove portion of the valve stem with a spring grip, a substantial amount of the advantages of the above described construction will be secured even though the said ring does not grip the stem but simply slips into its groove laterally. Such an arrangement will, of course, render the ring more liable to loss when the valve is taken apart, but nevertheless would serve all of the functions of the split ring when the valve is assembled.

By virtue of the unique method of mounting the unitary valve structure on the valve stem, that is, by causing the valve 16 and thimble 12 to clamp the split ring 15 so that these parts form a unitary structure freely movable on the valve stem, several important advantages are afforded. The unitary valve structure may rotate freely on the valve stem so that after the valve seats, it is not caused to rotate with the valve stem and grind upon the valve seat, but it is merely pressed directly against the valve seat. Owing to the recess 17 in the bottom of valve 16, and to the lost motion between the ring 15 and the sides of the groove 10 longitudinally of the valve stem, the unitary valve structure may move longitudinally of the valve stem as well as circumferentially of the stem.

The longitudinal movement need only be slight inasmuch as it merely intended to permit the end of the valve stem to bear against the bottom of the recess 17 as the valve seats, thereby to transmit downward pressure to the valve through the end 11 of the stem instead of through the connection between the stem and valve structure. Since the valve structure is attached to the valve stem at a distance from the end of the stem through the medium of clip 15 and groove 10, the area of the bearing surface at the lower end of the stem can, if desired, be made substantially equal to the cross sectional area of the valve stem, thereby to afford an adequate bearing surface between the end of the valve stem and the bottom of the recess in the valve.

I claim:

1. In a valve structure, a casing with a valve seat therein, a bonnet to receive a valve stem, a valve stem circumferentially grooved at its valve holding end, a cup-shaped valve and a valve thimble, threaded for mutual engagement, a split ring larger in diameter than the valve stem and seating in the said groove, the valve and thimble clamping the said ring when in place on the valve stem so that the valve, thimble and ring form a unitary structure freely rotatable on the valve stem.

2. In a valve structure, a casing with a valve seat therein, a bonnet to receive a valve stem, a valve stem circumferentially grooved at its valve holding end, a cup-shaped valve and a valve thimble, threaded for mutual engagement, a split ring larger in diameter than the valve stem and of less thickness than the groove and seating in the said groove, the valve and thimble clamping the said ring when in place on the valve stem so that the valve, thimble and ring form a unitary structure freely movable on the valve stem, said valve being recessed in its bottom to receive and make a loose sliding fit with the end of the valve stem.

3. In a valve structure, a casing with a valve seat therein, a bonnet to receive a valve stem, a valve stem circumferentially grooved at its valve holding end, a cup-shaped valve and a valve thimble, threaded for mutual engagement, a split ring larger in diameter than the valve stem and of less thickness than the groove and seating in the said groove, the valve and thimble clamping the said ring when in place on the valve stem so that the valve, thimble and ring form a unitary structure freely movable on the valve stem, said valve being recessed in its bottom to receive and make a loose sliding fit with the end of the valve stem, the upper rim of the valve adapted to make seating contact with the inner end of the valve bonnet.

Signed by me at Boston, Massachusetts, this sixth day of January 1915.

JACOB HUBER.

Witnesses:
 ODIN ROBERTS,
 RICHARD W. HALL.

Copies of this patent may be obtained for five cents each, by addressing the "Commissioner of Patents, Washington, D. C."